United States Patent
Kiemele et al.

(10) Patent No.: US 11,009,716 B2
(45) Date of Patent: May 18, 2021

(54) TRANSITIONING INTO A VR ENVIRONMENT AND WARNING HMD USERS OF REAL-WORLD PHYSICAL OBSTACLES

(71) Applicant: MICROSOFT TECHNOLOGY LICENSING, LLC, Redmond, WA (US)

(72) Inventors: Kenneth Liam Kiemele, Redmond, WA (US); Michael Thomas, Redmond, WA (US); Charles W. Lapp, III, Issaquah, WA (US); Christian Michael Sadak, Seattle, WA (US); Thomas Salter, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/837,694

(22) Filed: Apr. 1, 2020

(65) Prior Publication Data
US 2020/0225495 A1 Jul. 16, 2020

Related U.S. Application Data

(62) Division of application No. 15/667,509, filed on Aug. 2, 2017, now Pat. No. 10,627,635.

(51) Int. Cl.
| G02B 27/01 | (2006.01) |
| G06F 3/01 | (2006.01) |
| G09G 3/36 | (2006.01) |
| G09G 5/00 | (2006.01) |

(52) U.S. Cl.
CPC ....... *G02B 27/0179* (2013.01); *G02B 27/017* (2013.01); *G02B 27/0172* (2013.01); *G06F 3/011* (2013.01); *G09G 3/3611* (2013.01); *G02B 2027/014* (2013.01); *G02B 2027/0118* (2013.01); *G02B 2027/0138* (2013.01); *G02B 2027/0141* (2013.01); *G02B 2027/0187* (2013.01); *G09G 5/00* (2013.01)

(58) Field of Classification Search
CPC .... G02B 27/017; G02B 27/0179; G06F 3/011
See application file for complete search history.

(56) References Cited

U.S. PATENT DOCUMENTS

| 2016/0217616 A1* | 7/2016 | Kraver | A63F 13/213 |
| 2016/0350973 A1* | 12/2016 | Shapira | G06F 3/017 |
| 2018/0004286 A1* | 1/2018 | Chen | G06T 11/60 |

(Continued)

*Primary Examiner* — Michael Pervan
(74) *Attorney, Agent, or Firm* — Workman Nydegger

(57) ABSTRACT

Optimizations are provided for facilitating an improved transition between a real-world environment and a virtual reality environment. Initially, use of a HMD is detected and one or more real-world physical objects within a threshold proximity to the HMD are identified. Subsequently, a replicated environment, which includes virtual representations of the real-world physical object(s), is obtained and rendered in a virtual reality display. The replicated environment is transitioned out of view and a VR environment is subsequently rendered in the virtual reality display. In some instances, rendering of virtual representations of real-world physical objects into the VR environment occurs is response to detected triggering event.

21 Claims, 7 Drawing Sheets

(56) References Cited

U.S. PATENT DOCUMENTS

2018/0373412 A1* 12/2018 Reif .................... G06F 3/04815
2019/0187783 A1*  6/2019 Sevostianov ........... A63F 13/53
2019/0378280 A1* 12/2019 Cho ........................ G06T 7/246

* cited by examiner

TRANSITIONING INTO A VR ENVIRONMENT AND WARNING HMD USERS OF REAL-WORLD PHYSICAL OBSTACLES

CROSS-REFERENCE TO RELATED APPLICATIONS

This application is a divisional of U.S. patent application Ser. No. 15/667,509 filed on Aug. 2, 2017, entitled "TRANSITIONING INTO A VR ENVIRONMENT AND WARNING HMD USERS OF REAL-WORLD PHYSICAL OBSTACLES," which issued as U.S. Pat. No. 10,627,635 on Apr. 21, 2020, and which application is expressly incorporated herein by reference in its entirety.

BACKGROUND

Mixed-reality computer systems, including virtual-reality systems and augmented-reality systems, have recently received significant interest for their ability to create immersive experiences for users. Conventional virtual reality ("VR" hereafter) systems create an immersive experience such that a user's entire view is obstructed by a virtual world. VR systems are distinguished from conventional augmented-reality systems that merely augment a real-world view, by overlaying a hologram image in the field of view of the real-world view, for example. Unless specifically stated or unless specifically required, as understood by one of skill in the art, the descriptions herein apply to VR systems or equivalent system, not augmented-reality systems.

VR systems often use one or more on-body devices (e.g., a head-mounted device, a handheld device, etc.), typically including a head-mounted display ("HMD" hereafter). The HMD enables a user to view virtual objects and/or environments. By way of an example, a VR system may display a virtual representation of a scenic vista on a HMD with which the user may interact (e.g., walk around in the virtual environment).

Because a HMD may obstruct a user's view of the real-world entirely (e.g., where the HMD displays an entirely virtual environment), users of HMDs often find the initial immersion into a VR environment disorienting. Existing methods to reduce this disorientation include use of a pass-through camera attached to the mixed-reality computer system. The pass-through camera allows the computer system to capture the real-world surrounding the user and display it on the HMD. Use of a pass-through camera, however, gives rise to depth-of-field and other issues which can also cause user disorientation. Accordingly, there exists a strong need in the field to improve a HMD user's transition from a real environment to a VR environment.

Furthermore, once a user is immersed in a VR environment, the user's awareness of real-world objects in his/her vicinity is hindered. This presents a variety of safety hazards. For example, a user immersed in and interacting with a VR environment may walk into, or be hit by, walls, furniture, or even pets or people passing by. Accordingly, there exists a strong need in the field to improve systems, hardware storage devices, and methods for warning HMD users of real-world physical objects.

The subject matter claimed herein is not limited to embodiments that solve any disadvantages or that operate only in environments such as those described above. Rather, this background is only provided to illustrate one exemplary technology area where some embodiments described herein may be practiced.

3 Docket No. 13768.3234.1

BRIEF SUMMARY

Disclosed embodiments are directed to systems, hardware storage devices, and methods for transitioning scenes rendered in a VR environment and related devices and systems for providing warnings to users of real-world physical obstacles that are not visible through the VR devices.

In some embodiments, use of a head-mounted display (HMD) is detected, and one or more real-world physical objects within a threshold proximity to the HMD are identified. Subsequently, a replicated environment, which includes virtual representations of the real-world physical object(s), is obtained and rendered in a VR display. The replicated environment is then transitioned out of display and a VR environment is subsequently rendered in the VR display.

In other embodiments, a VR environment is rendered in a VR display. The proximity of at least one real-world physical object to the HMD is detected. Upon detection of a predetermined triggering event for triggering a notification to the user of the HMD, a virtual representation of the real-world physical object(s) is obtained and rendered in the virtual reality display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

4 Docket No. 13768.3234.1

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

6 Docket No. 13768.3234.1

Figure 6:
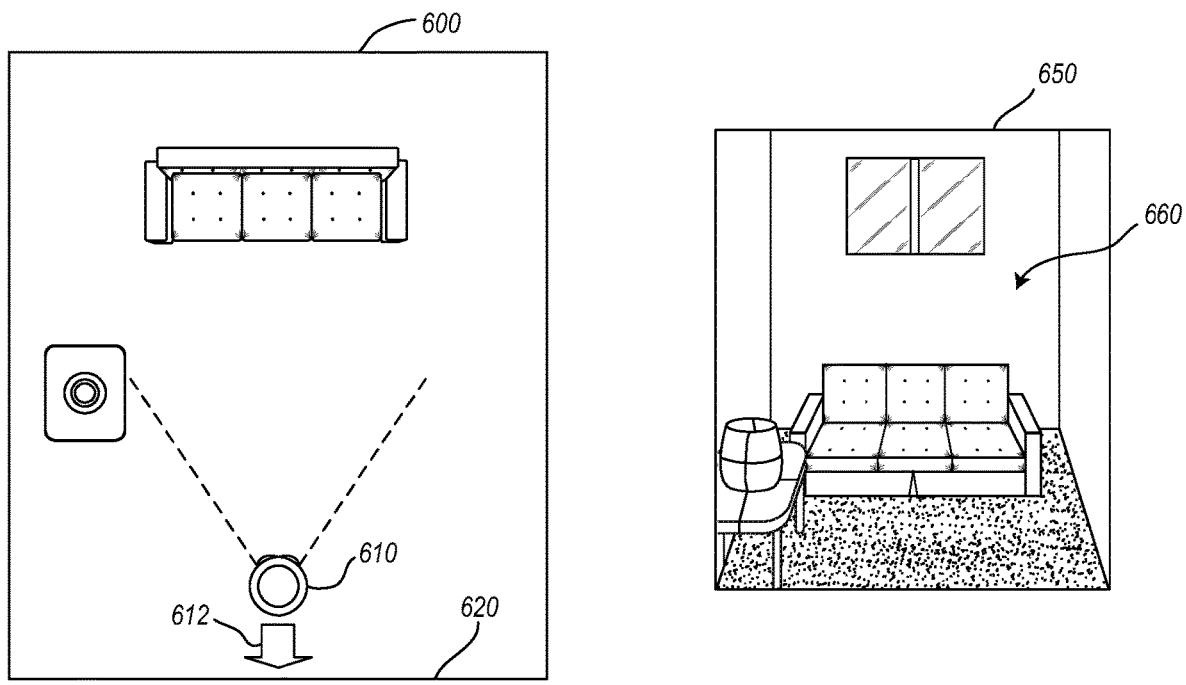

FIG. 6 illustrates an example of a scenario in which a HMD user is being warned of a real world physical object based on the user's velocity and orientation with respect to the object.

Figure 7:
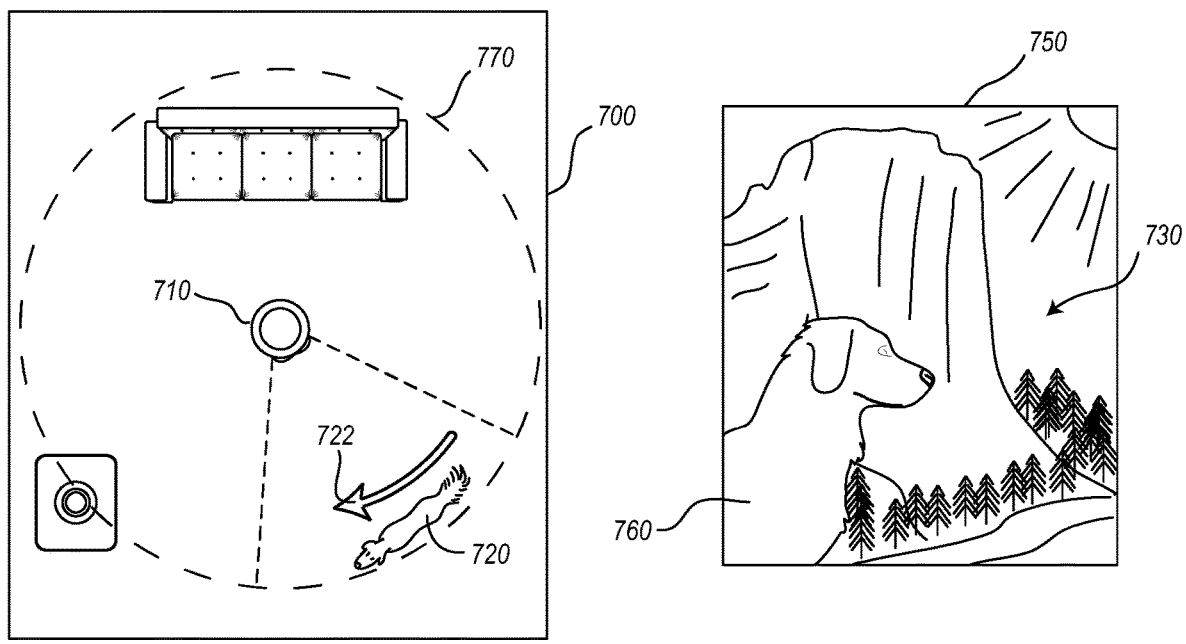

FIG. 7 illustrates an example of a scenario in which a HMD user is being warned of a real world physical object based on motion of the object within a threshold proximity to the user.

Figure 8:
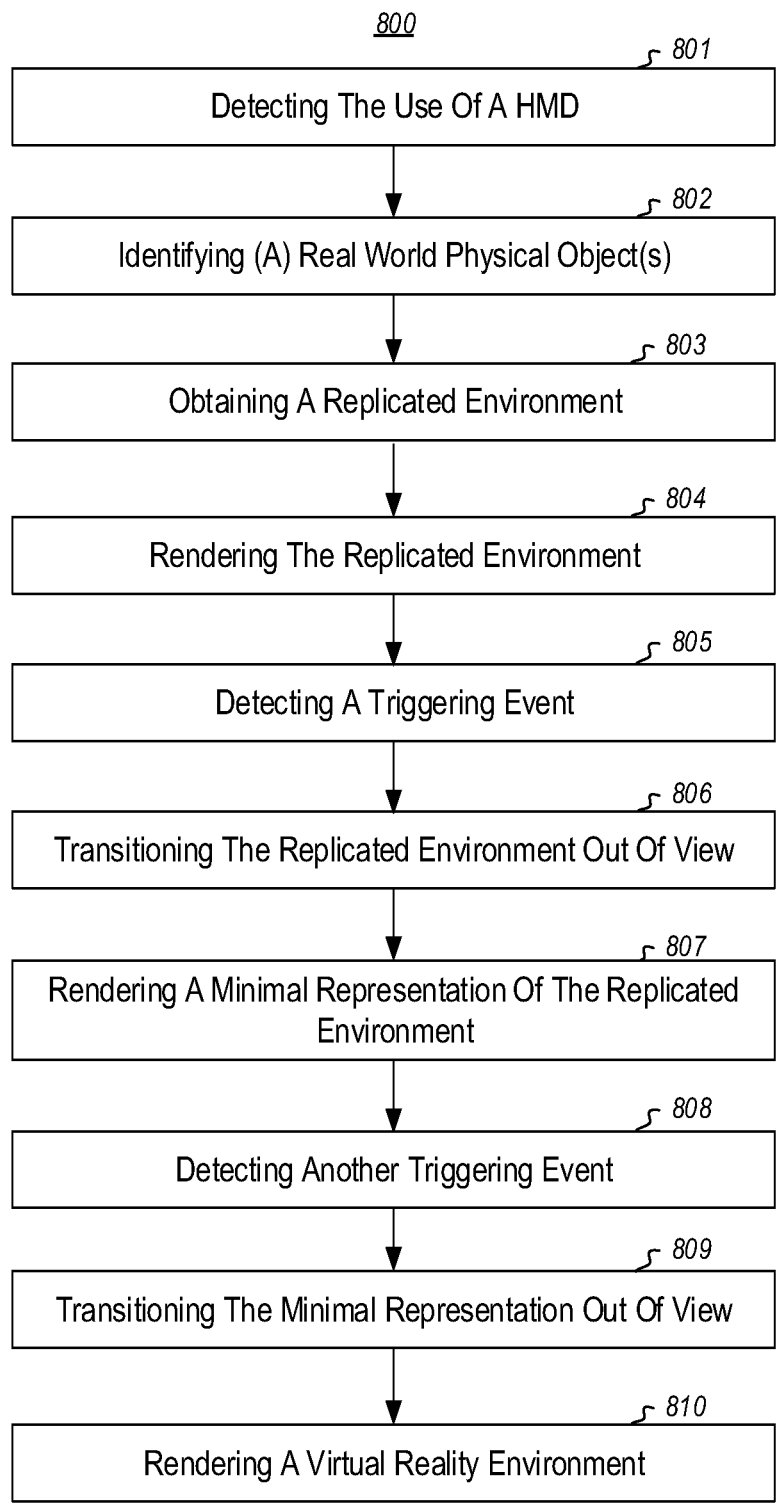

FIG. 8 illustrates an exemplary method for transitioning into a VR environment on a HMD.

Figure 9:
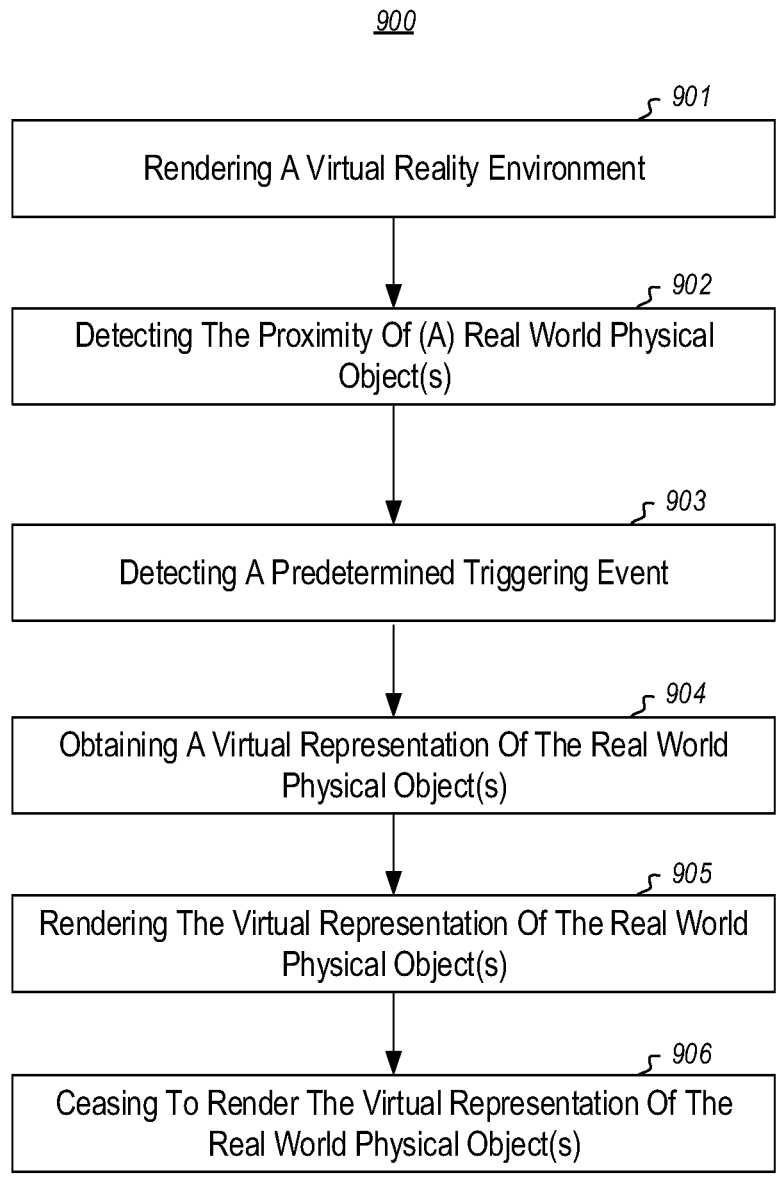

FIG. 9 illustrates an exemplary method 900 for warning HMD users of real-world physical objects.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments, and is not necessarily intended to limit the scope of the claimed invention.

Disclosed embodiments are directed to systems, hardware storage devices, and methods for facilitating a HMD user's transition from a real environment into a VR environment and for warning HMD users of real-world physical objects.

The embodiments may be implemented to overcome some of the safety issues associated with user immersion into and interaction with a VR environment via a HMD. Embodiments disclosed herein also allow for a natural bridge and smooth transition between the real-world and a VR environment. Easing a HMD user into a VR environment with such a transition can reduce or eliminate user disorientation and potential safety hazards that can result from abrupt transitions during use.

Some embodiments are also provided to warn HMD users of real-world physical objects so as to ameliorate user apprehension of colliding with real-world physical objects while they are immersed in a VR environment. The disclosed embodiments can therefore improve the overall consumer experience and sense of realism when operating a VR environment and increase user confidence in the VR system.

Some embodiments utilize or include a wearable display of a computer system, which may be a HMD. Using this HMD, real-world physical objects that are near the HMD are identified. When appropriate, the user is notified of the physical objects. For instance, in some embodiments, a replicated environment displayed with the HMD may include virtual representations of the real-world physical objects (e.g., a virtual representation of one or more elements of the room in which the user stands, along with virtual representations of one or more objects in the room). When triggered by a predetermined event, the system will transition the replicated environment out of view in the HMD and render a VR environment (e.g., via a slow or fast fade). Some embodiments include various numbers and types of transitions between the rendering of the replicated environment and the rendering of the VR environment, all of which may be initiated in response to various predetermined triggering events.

For HMD users already immersed in a VR environment (e.g., when a VR environment is already being rendered in a HMD), some disclosed embodiments detect the proximity of one or more real-world physical objects to the HMD, as well as one or more predetermined triggering events for transitioning from the VR environment to include at least a virtual representation of one or more of the real-world physical object(s). For instance, a HMD may be determined to be in a state of imminent collision with a real-world physical object or objects, due to proximity, velocity, rotation, orientation or other position/movement attributes of the HMD and/or objects. In response, the HMD system will render the virtual representation of one or more of the relevant real-world physical object(s) in the HMD (e.g., so as to make the user aware of the real-world physical object(s) while the user is still immersed in a VR environment).

Figure 1:
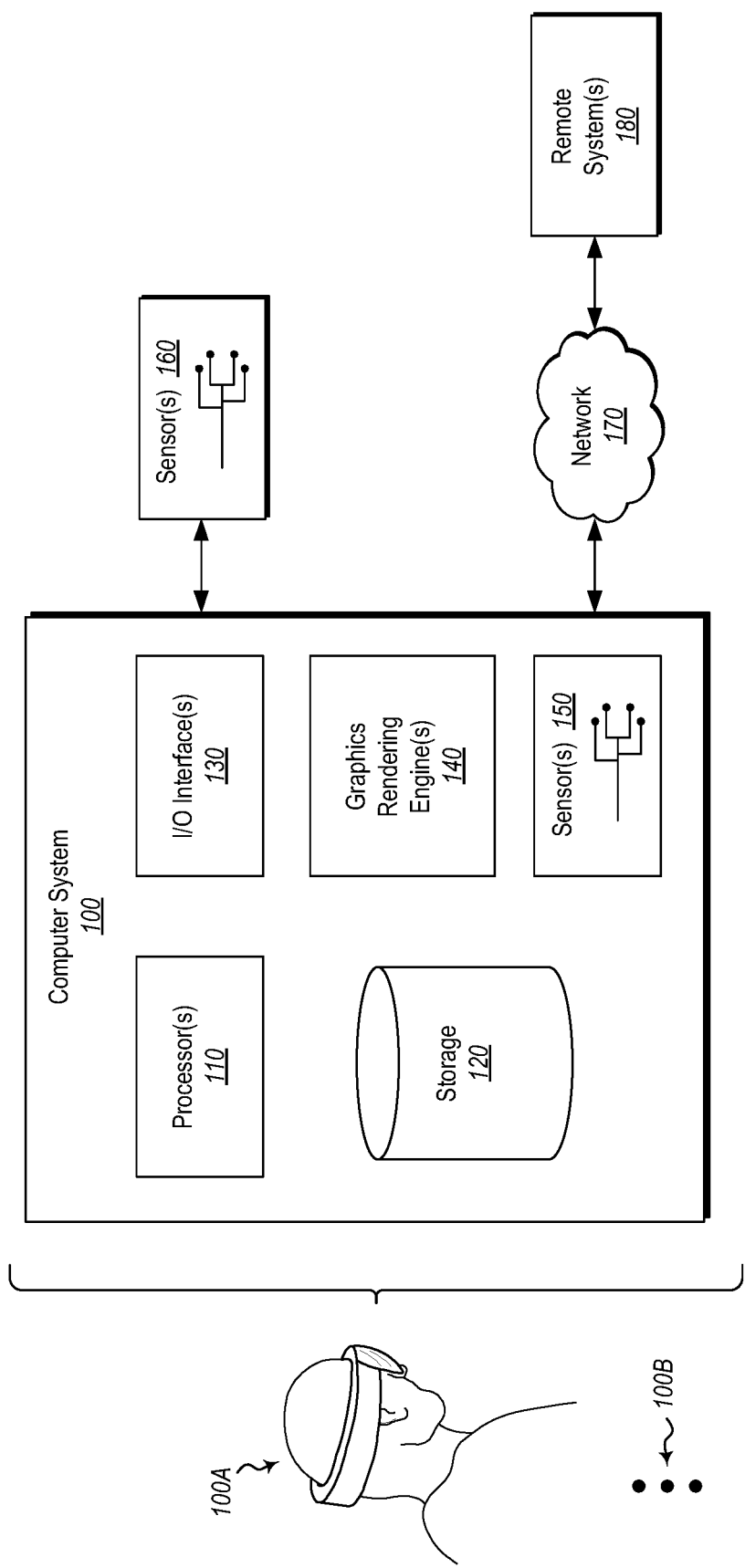
FIG. 1 illustrates an exemplary and non-limiting embodiment of a computer system.

Having just described some of the various benefits and high-level attributes of the disclosed embodiments, additional detailed disclosure will be provided with reference to FIG. 1, which presents an introductory discussion of an exemplary computing system that can be used to implement aspects of the disclosed embodiments. Following the discussion of FIG. 1, various architectures and supporting illustrations will be discussed using FIGS. 2-7 to further illustrate how VR environments and replicated environments can be used to transition displays that are rendered in VR HMDs. Lastly, various flow diagrams will be detailed with respect to the remaining figures (FIGS. 8-9), to describe corresponding methods for implementing the disclosed embodiments for transitioning views in VR HMDs and for warning users of real-world objects while using HMDs.

Exemplary Computing Systems

As illustrated in FIG. 1, an exemplary computer system 100 may take various different forms. For example, in FIG. 1, the computer system 100 is depicted as a wearable head unit 100A. Although the computer system 100 is depicted as a wearable head unit 100A, the ellipses 100B illustrates that the computer system 100 may be embodied in any form and is not limited strictly to the depiction illustrated in FIG. 1. By way of example, the computer system 100 may take the form of a desktop computer, a laptop, a tablet, a mobile phone, or any other computing device.

In its most basic configuration, the computer system 100 includes at least one hardware processing unit 110 and storage 120. The storage 120 may be physical system memory, which may be volatile, non-volatile, or some combination of the two. The term "memory" may also be used herein to refer to non-volatile mass storage such as physical storage media. If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g. as separate threads).

The disclosed embodiments may comprise or utilize a special-purpose or general-purpose computer including computer hardware, such as, for example, one or more processors (such as processor 110) and system memory (such as storage 120), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

As also shown in FIG. 1, the computer system 100 comprises various different components including input/output ("I/O") interface(s) 130, graphics rendering engine(s) 140, and one or more sensors 150. The computer system 100 may also be connected (via a wired or wireless connection) to external sensors 160 (e.g., one or more remote cameras, accelerometers, gyroscopes, acoustic sensors, magnetometers, etc.). Further, the computer system 100 may also be connected through one or more wired or wireless networks 170 to one or more remote systems 180 that are configured to perform any of the processing described with regard to computer system 100. The computer system 100 may also access computer-executable instructions, data, data structures, etc. stored on the remote system(s) 180 through the wired or wireless network(s) 170.

During use, a user of the computer system 100 is able to perceive information (e.g., a VR scene) through a display screen that is included within the I/O interface(s) 130, and which is visible to the user. The I/O interface(s) 130 and sensors 150/160 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a wall, a user's hand, a stylus, and/or any other object(s) that the user is near or may interact with while being immersed in a VR scene.

In some instances, the positioning and movement of the user and the objects (both virtual and actual) are continuously monitored (or, alternatively, periodically monitored at a predetermined interval and/or in response to a detected event (e.g., movement of the HMD)). This monitoring specifically detects any variation in the position and the movement of the objects, such as a detected change in position, velocity, orientation, or acceleration. These movements can be absolute movements and/or relative movements, such as compared to a relative positioning of the HMD, and such that movements/positioning of the HMD will be calculated into the relative movements/positioning of the objects as they are presented in the scene.

The graphics rendering engine 140 is configured, with the processor(s) 110, to render one or more virtual objects within the scene. The rendered object(s) can be a coarse rendering (e.g., low resolution and/or without texturing, for example), or a rich rendering (e.g., high resolution and/or with texturing). In some embodiments, this rendering includes virtual representations of real-world physical objects that are mapped to the relative positions of the real-world objects. As a result, the virtual objects accurately move in response to movement of the real-world objects, as well as movement of the computer system 100. The graphics rendering engine 140 is also configured to render one or more virtual objects that are purely virtual (without being mapped to real-world objects).

The graphics rendering engine(s) 140, which may include one or more GPUs, may be configured to render the virtual objects with certain display properties. These properties include coloring, transparency or opaqueness, texturing, edge definition (e.g., thickness and/or sharpness vs. blurring and/or feathering), size, and so forth. In some embodiments, when certain position (e.g., distance, orientation, velocity and/or other position/movement) thresholds are detected for the real-world object(s), one or more combinations of the display properties for the virtual representation of the object(s) will be modified (at least while the detected positioning, orientation, velocity and/or position/movement meets or exceeds the thresholds).

A "network," like the network 170 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 170. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

As discussed above, computer systems are able to provide a broad variety of different functions. One such function includes facilitating a HMD user's transition from a real-world environment to a VR environment. Another such function includes providing a HMD user with warnings of real-world physical objects that may pose a hazard to the user. FIGS. 2-7 demonstrate these functionalities with illustrations of exemplary implementations and embodiments.

Transitioning into a VR Environment

Figure 2:
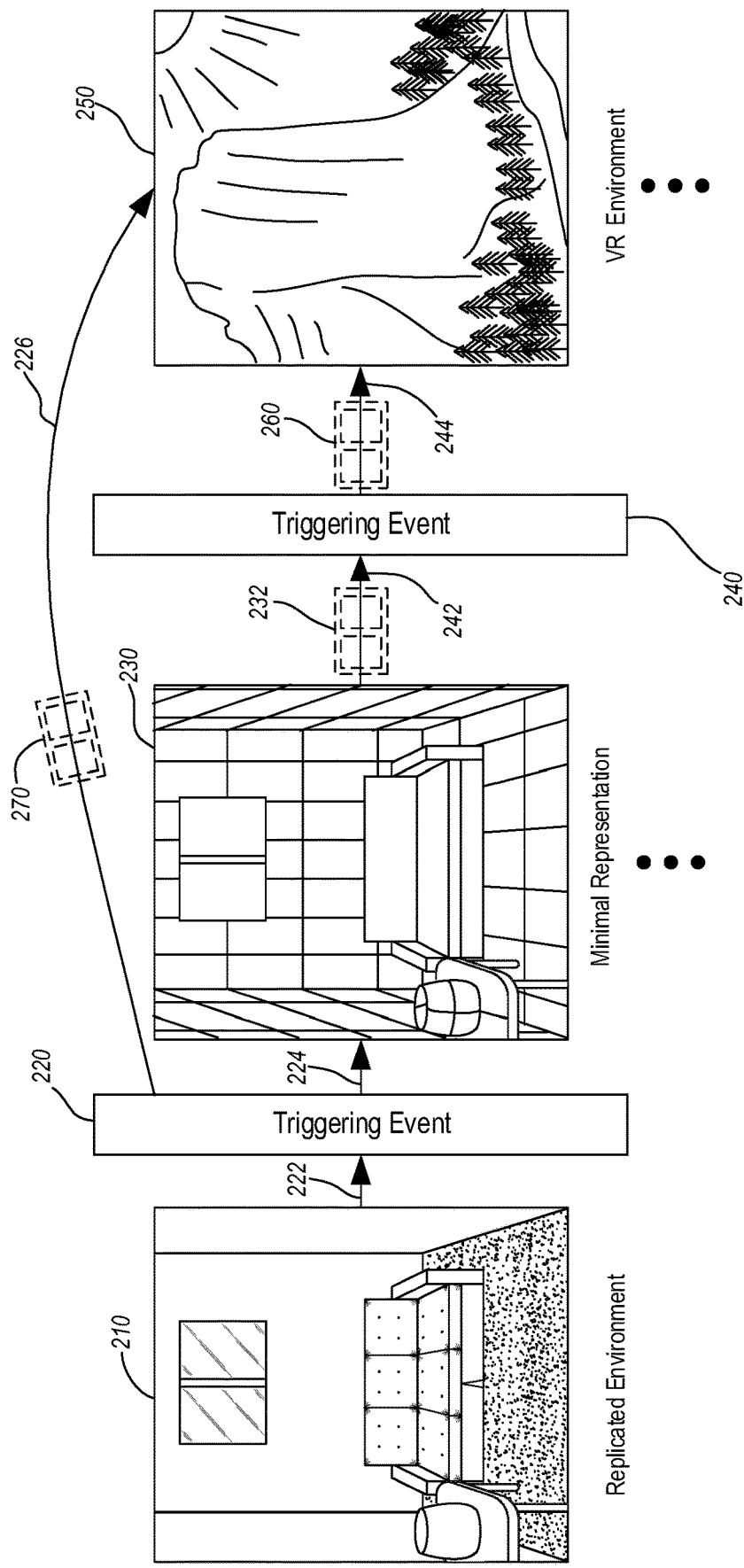
FIG. 2 illustrates examples of scenes which may be displayed on a HMD to facilitate a safe transition between a real-world environment and a VR environment.

To demonstrate facilitation of a HMD user's transition from a real-world environment to a VR environment, FIG. 2 illustrates several exemplary scenes which may be displayed on a HMD, according to the present disclosure. One of the scenes is a replicated environment 210, which includes virtual representations of real-world physical objects in the vicinity of the HMD user. As illustrated, the replicated environment 210 includes virtual representations of a vase, a couch, a floor and walls, and a window, which may be real-world physical objects in the vicinity of a HMD user. It will be appreciated, however, that any types or combinations of real-world physical objects may be represented virtually as part of a replicated environment 210. The embodiments are thus not limited only to the scenario illustrated in FIG. 2.

The replicated environment 210 may be obtained by the computer system 100 in a variety of ways. The computer system 100 may generate the replicated environment 210. Alternatively, the computer system 100 may obtain a stored representation of the replicated environment 210 from data maintained in local storage 120 and/or from data stored on a remote system or systems 180. In some instances, a replicated environment and/or objects are stored in response to determining that the HMD is frequently in proximity with the real-world physical objects corresponding to their stored representations.

As indicated above, the computing system can sometimes generate the replicated environment 210 and/or any objects represented by the replicated environment 210. For example, sensor(s) 150 and/or sensor(s) 160 may be used with I/O interface(s) 130 (e.g., a combination of a sensor package and RGB camera) to create a wireframe or mesh of real-world physical objects and apply textures to those objects. In the presently preferred embodiment, the textures can be realistic, with a level of detail that is sufficient to give the HMD user the impression that they are looking directly at the objects in the user's environment, similar to a mixed-reality scene presented with an augmented-reality device, even though it is all VR. The disclosed embodiments are not, however, limited to utilizing replicated environments/objects that provide a high level of texturing and detail to replicate the aforementioned realism.

The replicated environment 210 may be updated continuously based on detected variations (relative or absolute) in the position and movement of the HMD user and/or the real-world physical objects in the vicinity of the user. The replicated environment 210 may also be structured so as to avoid depth-of-field and other issues that arise from the use of pass-through cameras. The user is therefore able to walk around in and interact with real-world physical objects based on their virtual representations in the replicated environment 210.

In some embodiments, the real-world physical objects included in the replicated environment 210 are restricted to those within a threshold proximity to the HMD and/or the HMD user. As used herein, the term HMD and HMD user may be used interchangeably. Accordingly, the scope of the disclosure should be interpreted to consider embodiments to specific thresholds associated with the positioning/movement of the HMD user to also include embodiments for corresponding thresholds associated with positioning/movement of the HMD.

As presently shown in FIG. 2, real-world physical objects outside of the predetermined threshold of relevant movement/position to the HMD are not included in the replicated environment 210.

In some embodiments, the computer system 100 displays the replicated environment 210 on the HMD in response to: an activation of a control within an application run on the computer system 100 (e.g., user input or an application event); in response to detection of placement of the HMD on a user's head; in response to detection of user eye movement or focus; and/or in response to another event.

In some instances, the computer system 100 will continue to render the replicated environment 210 on the HMD until a first triggering event 220 is detected (see arrow 222). The first triggering event 220 may include, for instance, activation of a control within an application run on the computer system 100, activation of a physical control on the computer system 100 (e.g., on an I/O interface 130), expiration of a predetermined time period after detecting positioning of the HMD on a user's head, detection of user eye movement or focus (e.g., on a sensor 150/160), detection of other HMD movement and/or other triggering events.

In some exemplary embodiments, once the first triggering event 220 is detected (see arrow 224), the computer system 100 will begin rendering a minimal representation 230 of the replicated environment 210, and which is structured to depict the real-world physical objects in the vicinity of the HMD user with less detail than the replicated environment 210. For example, the vase displayed in the replicated environment 210 is depicted in the minimal representation 230 as a wireframe, and the couch is represented in the minimal representation 230 as a polygon mesh without texturing. Additionally or alternatively, real-world physical objects may be depicted in the minimal representation 230 with less detail than the replicated environment 210 in terms of granularity, opacity, etc. Additionally, certain objects rendered in the replicated environment may be omitted in the minimal representation (although not presently shown).

A minimal representation 230 may be obtained in ways similar to a replicated environment 210 (e.g., from storage or a third party system). In some instances, the minimal representation 230 is generated from the replicated environment 210 itself. In some embodiments, the minimal representation 230 is one of a plurality of minimal representations (indicated by boxes 232), which may differ from one another in terms of detail, fade, blur, opacity, granularity, etc. For example, the couch depicted in the minimal representation 230 may be depicted as a wireframe instead of an untextured polygon mesh in other minimal representations 232. A minimal representation 230 may be rendered on the HMD continuously, or be pulsed (periodically rendered) into and out of view as part of a transition between the replicated environment 210 and a VR environment. Further, a plurality of minimal representations 232 may be rendered in various sequences or modes to effectuate a desired transition between the replicated environment 210 and a VR environment.

The system will sequentially transition between different minimal representations, in some embodiments, in response to detecting new triggering events and/or as part of the transition from the replicated environment to the minimal representation and/or as part of the transition from the minimal representation to the VR environment.

In some instances, the computer system 100 will render a minimal representation 230 (or a sequence of minimal representations 232) on the HMD until detection of a particular new or second triggering event 240 (see arrow 242). The second triggering event 240 may be different than or similar to the previous triggering event 220 (e.g., expiration of predetermined time period after the previous triggering event 220, activation of a physical or application control, eye movement or focus). After detection of a second triggering event 240, the computing system may render a VR environment 250 (see arrow 244) on the HMD. In some embodiments, the computing system renders transition scene(s) 260 before rendering the VR environment 250 in full. The transition scenes may be combinations of variations of minimal representations, replicated environments, or VR environments, with varying degrees of detail, fade, blur, opacity, granularity, etc. in order to effectuate a desired transition into the VR environment 250.

In one embodiment, the computer system 100 does not render minimal representations 230/232. Instead, the computer system 100 renders a replicated environment 210 on the HMD until detection of a triggering event (see arrow 222), and then renders transition scene(s) 270 (e.g., combinations of variations of replicated environments and VR environments) before rendering a VR environment 250 on the HMD (see arrow 226). For example, the computing system may fade the virtual objects in the replicated environment 210 out of view in the HMD over four seconds in response to detection of the triggering even 220, and then fade the VR environment 250 into view in the HMD over four seconds. The fade may also occur over other time periods, less than or more than the referenced four seconds. By transitioning the display in this manner, it is possible to facilitate a smooth transition into a VR environment for HMD users, avoiding depth-of-field and other issues that can sometimes arise from abrupt transitions when using VR systems and that can cause user disorientation and improving the overall consumer experience with mixed-reality systems.

Warning HMD Users of Real-World Physical Objects

Figure 3:
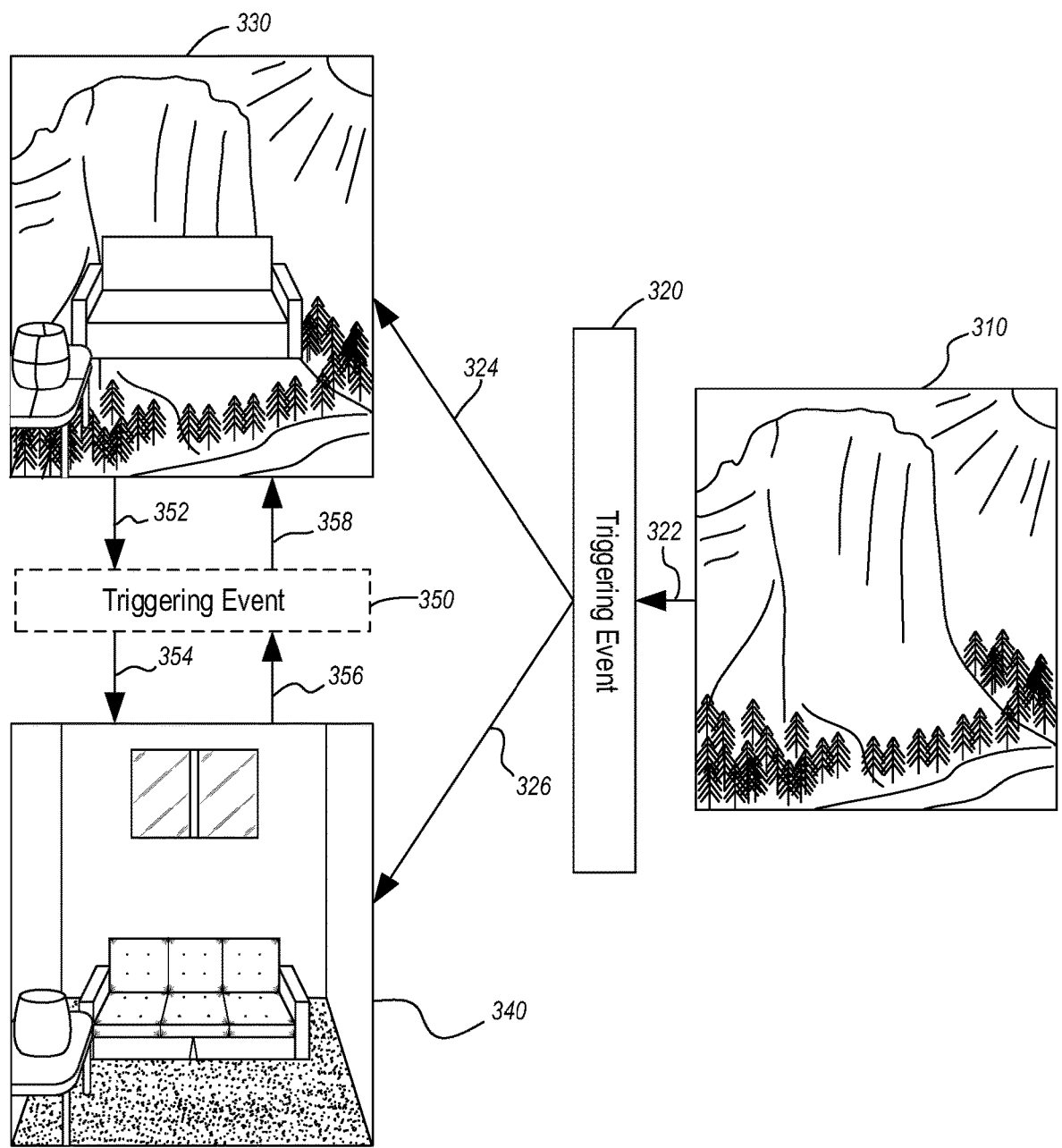
FIG. 3 illustrates examples of scenes which may be displayed on a HMD to warn HMD users of real-world physical objects.

When a user is immersed in a VR environment, their perception of real-world objects is ordinarily hindered. While immersed in and/or interacting with the VR environment (e.g., by walking around), users run the risk of being harmed by real-world physical objects. FIG. 3 illustrates exemplary embodiments and implementations which demonstrate the computer system 100 functionality of warning a HMD user of real-world physical objects.

In some embodiments, a computer system 100 continues to render a VR environment 310 in a HMD until detection of a triggering event 320 (see arrow 322). The triggering events may be associated with physical properties (e.g., orientation, velocity, acceleration, position) of the computing system and/or real-world physical objects in the vicinity of the HMD user. The triggering event 320 may be based on absolute physical properties or relative physical properties, such as the velocity of one real-world physical object as compared to the velocity of the HMD user, and may be detected by sensor(s) 150/160. Triggering events 320 may include, but are not limited to, detection of the HMD user within a threshold proximity to and facing towards a real-world physical object, detection of HMD user movement/velocity that meets certain conditions, detection of movement of a real-world physical object, detection of acoustic signals, activation of a physical control or a control within an application run on the computer system 100 and/or detection of particular eye movement or focus. Additional examples and implementations of triggering events are set forth herein.

In some instances, upon detecting a triggering event 320, the computer system 100 will render a virtual representation of one or more real-world physical object(s). The virtual representation of the object(s) may be rendered in addition to, in combination with, or instead of the VR environment 310. The virtual representation(s) of the real-world physical object(s) may be untextured representation(s) 330 (e.g., wireframe(s) or simple meshes) of the real-world physical object(s) (see arrow 324). For example, the couch depicted in the untextured representation 330 is an untextured polygon mesh representation of a real-world physical couch in the vicinity of the HMD user. The virtual representation(s) of the real-world physical object(s) may also be partially or fully textured representations(s) 340 (e.g., realistically textured as in the replicated environment 210) of the real-world physical object(s) (see arrow 326). As illustrated, the couch depicted in the fully textured representations 340 is realistically textured. The virtual representations of the real-world physical object(s) that are rendered may represent object(s) contextually related to the triggering event 320 and/or the one or more other objects being replicated. In some instances, the fully textured representations 340 include virtual representations of an entire environment (e.g., entire room) in which the HMD user stands. In some instances, the virtual representations include objects that are not directly related to the triggering events, but which can provide improved perception to the user. In some instances, the virtual representations omit some of the real-world physical objects that are in the user's environment, which can save on the computational expense required to obtain and render the virtual representations.

The virtual representations of the real-world physical objects may be rendered continuously (without pulsing) or, alternatively, be pulsed into and out of view. Pulsed views can be less expensive and can create less of a distraction for the user. The manner in which the virtual representations are rendered may also be based on or depend directly on the measured parameters or values associated with the triggering events (e.g., relative position/movement of the HMD/objects). For example, as a HMD user faces and approaches a real-world physical object, a virtual representation of that object may be faded into view on the HMD based on a function of the relative proximity/velocity of the HMD to the real-world physical object.

Upon detection of additional triggering events 350, which may be similar to the previously mentioned triggering events 320, the computer system 100 may render virtual representations of real-world physical objects in addition to, in combination with, or instead of the virtual representations of real-world physical objects already being rendered in the HMD. In one example, a computer system 100 renders an untextured representation 330 of a couch over a VR environment 310 in response to a triggering event 320. The computer system 100 continues to render this untextured representation 330 of the couch until an additional triggering event 350 is detected (see arrow 352).

In one embodiment, the additional triggering event 350 is detection of the user's eyes focusing on the untextured representation 330 of the couch. In response to detection of the aforementioned triggering event 350, the computer system 100 renders a fully textured representation 340 of the couch, as well as virtual representations of the other real-world physical objects in the vicinity of the HMD user (see arrow 354). The computer system 100 may continue to render the fully textured representations 340 of these real-world physical objects until detection of yet another triggering event 350 (see arrow 356). Upon detection of yet another triggering event 350 (e.g., activation of a user control in an application running on the computer system 100), the computing system may again render the initial untextured representation 330 of the couch over the VR environment 310 (see arrow 358). It will be appreciated, however, that any types of virtual representations of any types of real-world physical objects may be rendered in response to additional triggering events 350. The embodiments are therefore not limited to the scenario illustrated in FIG. 3.

After rendering a virtual representation of a real-world physical object in response to a triggering event 320/350, and upon determining that triggering events 320/350 are no longer detected, the embodiments cease to render the virtual representations of real-world physical objects and continue rendering the VR environment 310 in full. The cessation of rendering the virtual representations may also depend on measured parameters or values, such as values that pertain to a triggering event 320/350 (e.g., fading the virtual representations out of view based on a function of the velocity of the HMD user).

Figure 4:
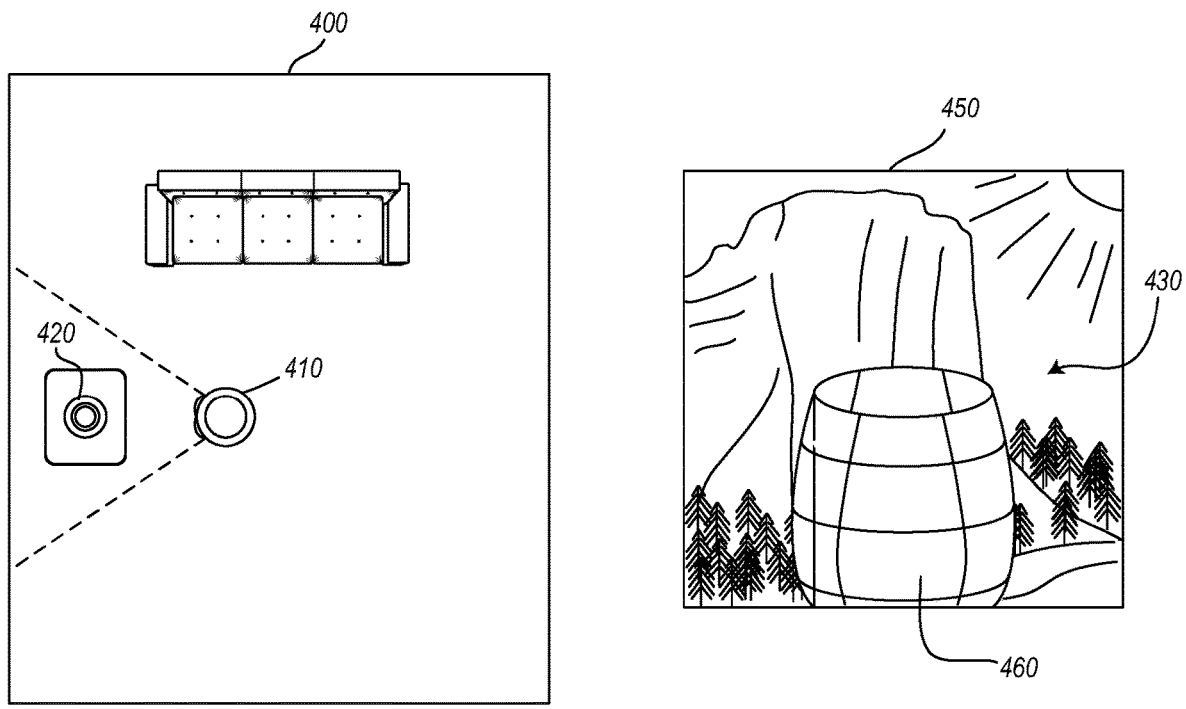
FIG. 4 illustrates an example of a scenario in which a HMD user is being warned of a real world physical object based on the user's proximity and orientation with respect to the object.

FIGS. 4-7 serve to further illustrate implementations and examples of the triggering events 320. A triggering event may be detection of the HMD user within a threshold proximity to and facing towards a real-world physical object, as demonstrated in FIG. 4. FIG. 4 depicts a top view of a room 400 in which a HMD user 410 is facing a vase 420 and is standing in close proximity to the vase (user field of view is indicated by dashed lines).

FIG. 4 also depicts a scene 450 displayed on the HMD. The HMD user 410 is immersed in a VR environment 430 and runs the risk of potentially damaging the vase 420 or harming themselves if they continue to interact with the VR environment 430. The embodiments detect (e.g., via sensors 150/160) that the HMD user is facing towards and within a predetermined threshold proximity to the vase 420. In some embodiments the system obtains a virtual representation of the vase 460 (e.g., via a combination of a sensor package and RGB camera) and renders the virtual representation of the vase 460 (e.g., an untextured representation) in the HMD. As currently illustrated in FIG. 4, the triggered virtual representation of the vase 460 is a wireframe that is dynamically rendered in response to the triggering event(s) over the VR environment 430, directly into the HMD scene 450, thus warning the HMD user 410 of the presence of the vase 420.

Figure 5:
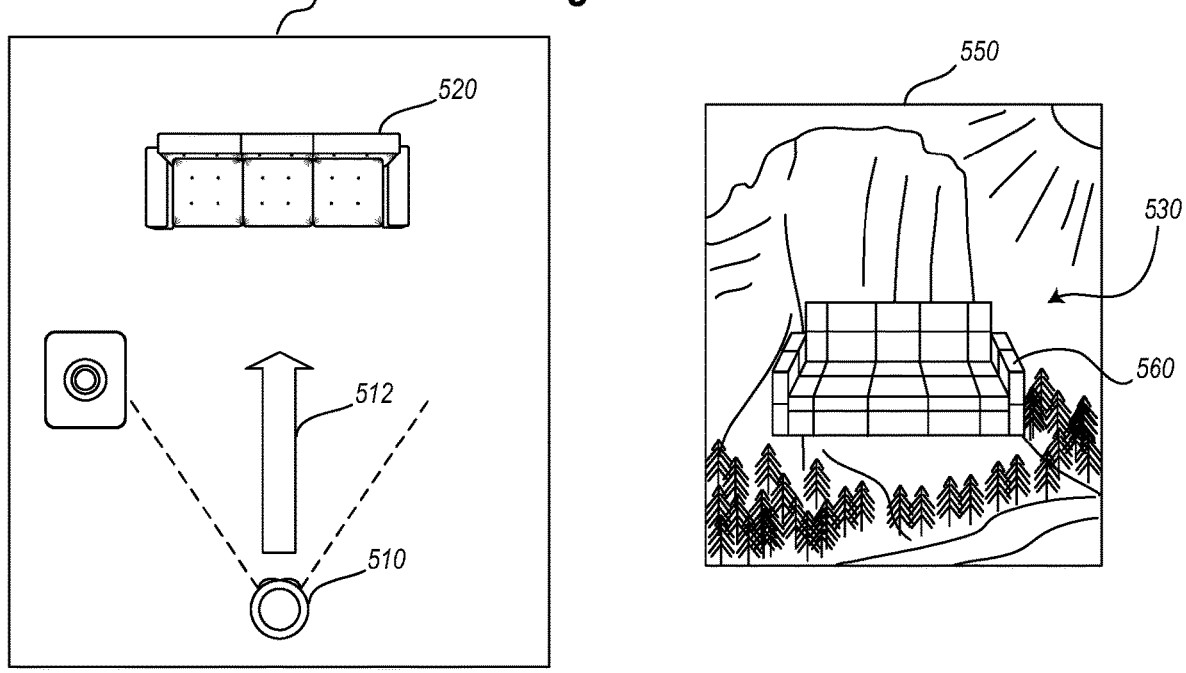
FIG. 5 illustrates an example of a scenario in which a HMD user is being warned of a real world physical object based on the user's velocity with respect to the object.

As previously mentioned, some triggering events include the detection of a relative velocity or position of a HMD. In FIG. 5, a VR scene 550 is being rendered to a user 510 while the user 510 is located within a real-world room 500. The VR scene 550 is rendered to the user 510 through a HMD. In this embodiment, the user 510 is currently moving towards a real-world couch 520 in the room. The velocity of a user 510 is indicated by arrow 512. As in FIG. 4, the HMD user 510 is immersed in a VR environment 530, and is thus at risk of colliding with the couch 520 if the user 510 continues to move towards the couch 520. In this embodiment, the system detects the relative proximity/movement of the couch 520 to the HMD user 510. Then, when the threshold relative velocity/proximity has been reached (e.g., the user is too close to the couch and/or moving too quickly towards the couch), the system obtains and renders the appropriate virtual representation of the couch 560 in the HMD to warn the user. In FIG. 5, the virtual representation of the couch 560 is a wireframe rendered over the VR environment 530 in the HMD scene 550, so as to warn the HMD user 510 of a potential collision with the couch 520 and is only rendered in response to detecting the threshold proximity/velocity being met. The couch 560 is rendered continuously or pulsing, until the threshold is no longer met.

In FIG. 6, a top view of a room 600 is shown in which a HMD user 610 is walking backwards towards a wall 620 (user 610 velocity is indicated by arrow 612). A depiction of the scene 650 displayed on the HMD is also shown. Because the HMD user 610 is immersed in a VR environment, the user 610 runs the risk of backing into the wall 620 and sustaining injury or damaging the HMD or other property. After detecting the proximity of the HMD user 610 to the wall 620, the embodiments may detect the orientation of the HMD user 610 and then determine a threshold velocity/positioning based on the orientation of the HMD user (e.g., facing away from the wall) and the proximity of the user 610 to the wall 620. The threshold velocity/positioning may, for example, be lower when a user is facing away from the real-world physical object that the user is approaching.

In response to detecting that the velocity of the HMD user 610 exceeds the threshold velocity, the system will obtain and render a virtual representation of the entire room 660 (e.g., untextured or at least partially textured) in which the user 610 is operating the HMD, as illustrated in FIG. 6. In some instances, the system pulses the virtual representation of the entire room 660 into and out of view in the HMD to warn the user 610 of the risk of backing into a real-world physical object, but other sequences may be used (e.g., fading the virtual representation of the entire room 660 as the velocity of the user 610 exceeds the threshold velocity).

Other triggering events that can be used for transitioning displays include the detected movement of real-world physical objects. FIG. 7 depicts a top view of a room 700 in which a HMD user 710 is immersed in a VR environment 730. FIG. 7 also depicts the scene 750 displayed on the HMD of the user 710. As illustrated, a dog 720 is moving in the room 700 near the user 710 (the velocity of the dog 720 is indicated by arrow 722). Erratic or unexpected motion of the dog 720 may become hazardous to the HMD user. The system detects the relative proximity/velocity of the dog 720 to the HMD user 710. The embodiments may be configured to detect motion of real-world physical objects within a certain threshold proximity to the user 710 (e.g., via sensor(s) 150/160). An exemplary threshold proximity 770 is shown in FIG. 7. Upon determining that the dog 720 is moving within a threshold proximity 770 to the user 710, the embodiments may obtain and render a virtual representation of the dog 760 in the HMD so as to make the HMD user 710 aware of the movement of the dog 720. For situations where real-world physical objects are moving within the threshold proximity 770 to the HMD user 710, but outside of the field of view of the HMD user 710 (e.g., a moving dog behind the user), the system may render virtual representations of other real-world physical objects within the vicinity of the HMD user 710 (e.g., pulsing a virtual representation of the entire room as a warning to be careful, or an icon/textual warning associated with the detected object).

Those skilled in the art will recognize that the principles demonstrated in FIGS. 4-7 may be applied to other scenarios in which a user faces or approaches one or more real-world physical objects (e.g., a wall, a table, or another person). The embodiments are thus not restricted to the scenarios, positional structures, or real-world physical objects depicted in FIGS. 4-7.

Virtual representations of real-world physical objects, as demonstrated in FIGS. 4-7, may be rendered in addition to, in combination with, or instead of any scene already depicted on the HMD. Furthermore, as illustrated in FIG. 7, virtual representations of multiple objects may be rendered in response to any triggering event. For example, a computer system 100 may render a virtual representation of an entire room in response to detection of a triggering event which pertains only to a real-world physical table, even where the HMD user is not facing towards the table.

The warning functionalities demonstrated in FIGS. 4-7 allow users to become aware of real-world physical objects while immersed in a VR environment. In some embodiments, users are only warned when the real-world physical objects become potentially problematic to the user, thus allowing the user to stay immersed and only be interrupted when necessary for safety reasons.

Exemplary Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. These methods are implemented by one or more processors of a computer system (e.g., the computer system 100 of FIG. 1). By way of example, a computer system includes one or more computer-readable hardware storage media that store computer-executable code. This computer-executable code is executable by the one or more processors to cause the computer system to perform these methods.

FIG. 8 illustrates a flowchart 800 of exemplary methods for transitioning displays including a VR environment with a HMD.

As shown, the method(s) include: an act of detecting use of a HMD (act 801). This act may be performed by I/O interface(s) 130 and/or sensor(s) 150/160 (e.g., activation of a physical control or detection of eye movement/focus or placement of a HMD on a user's head) or by other systems (e.g., activation of a user control within an application run on the computer system 100).

One or more real-world physical objects are also identified (act 802), which may be performed by the sensor(s) 150/160. Subsequently, a replicated environment is obtained (act 803), which includes virtual representations of real-world physical objects in the vicinity of the HMD user. The replicated environment may be generated using sensor(s) 150/160 and/or I/O interface(s) 130, such as a combination of a sensor package and RGB camera used to create a mesh of real-world physical objects and apply textures. The replicated environment may also be obtained from local storage 120 or from data stored on a remote system or systems 180 via a network 170.

Next, the replicated environment is rendered (act 804), such as with the HMD. The replicated environment may be rendered continuously the same way and/or dynamically updated with new or fewer objects, based on detected variations in the position and movement of the HMD user and/or the real-world physical objects in the vicinity of the user. Rendering a replicated environment allows the HMD user to maintain environment familiarity while in the early stages of transitioning into a VR environment.

Next, the system detect a triggering event (act 805). The triggering event may be detected by various parts of the computing system (e.g., sensor(s) 150/160, I/O interfaces 170, remote systems 180). Furthermore, the triggering event may be, but is not limited to, activation of a control within an application run on the computer system 100, activation of a physical control on the computer system 100 (e.g., on an I/O interface 130), expiration of a predetermined time period after detecting positioning of the HMD on a user's head, or detection of user eye movement or focus (e.g., on a sensor 150/160).

Upon detection of the triggering event, the system transitions the replicated environment out of view (act 806) (e.g., fading the virtual representations of the real-world physical objects from view in the HMD), and renders a minimal representation of the replicated environment (act 807). The minimal representation is a representation of the replicated environment which is structured to depict the real-world physical objects in the vicinity of the HMD user with less detail than the replicated environment (wireframe, untextured polygon mesh, etc.). A minimal representation may be rendered continuously or pulsed into and out of view in the HMD. The minimal representation rendering can also include the sequential presentation of different minimal representations having different texturing, resolution, objects, etc.

Subsequent to rendering the minimal representation, the system detects another triggering event (act 808), which may be expiration of a predetermined time period after the first triggering event, or other events similar to the first triggering event. In response, the system transitions the minimal representation out of view in the HMD (act 809) (e.g., via a visual fade or a sequence of other minimal representations). Subsequent to the new triggering event, and as part of the fade, the VR environment is rendered in the HMD (act 810), which can be transitioned into view in the HMD in a variety of ways (e.g., via a visual fade or a sequence of VR scenes).

The foregoing embodiments can be used to help a HMD user maintain environment familiarity while transitioning from a real environment to a VR environment and to avoid disorientation that may result from an abrupt transition between a real environment and a VR environment.

FIG. 9 illustrates another flowchart 900 associated with exemplary methods for warning HMD users of real-world physical objects.

As shown, the system first renders a virtual reality environment (act 901). This encompasses the scenario where a VR environment is being rendered in a HMD for a user to view and/or interact with, as well as other scenarios where a VR environment is rendered in a display. Method 900 further includes an act of detecting the proximity of one or more real-world physical objects (act 902). Act 902 may be performed by, for example, sensor(s) 150/160.

Next, the system detects a predetermined triggering event (act 903). The predetermined triggering event may be based on absolute physical properties or relative physical properties of the computing system and/or real-world physical objects in the vicinity of the HMD user. The predetermined triggering event may be, but is not limited to, detection of the HMD user within a threshold proximity to and facing towards a real-world physical object, detection of HMD user velocity that meets certain conditions, detection of movement of a real-world physical object, detection of acoustic signals, activation of a physical control or a control within an application run on the computer system 100, or detection of particular eye movement or focus of the HMD user.

Next, the system obtains a virtual representation of the real-world physical object(s) (act 904). The virtual representation(s) may be untextured or partially or fully textured representations of the real-world physical object(s). The virtual representation(s) may be generated using sensor(s) 150/160 and/or I/O interface(s) 130, such as a combination of a sensor package and RGB camera used to create a mesh of real-world physical objects and apply textures. The virtual representation(s) may also be obtained from local storage 120 or from data stored on a remote system or systems 180 via a network 170. Multiple virtual representations of multiple objects may be obtained, including virtual representations of real-world physical objects which do not pertain to the predetermined triggering event of act 903.

Next, the system renders the virtual representation(s) of the real-world physical object(s) (act 905). The virtual representation(s) may be rendered continuously or pulsed into and out of view in the HMD. Additionally, the virtual representation(s) may be rendered based on a function of parameters or values which pertain to the predetermined triggering event (e.g., fading a virtual representation into view as a function of proximity of the real-world physical object to the HMD user). The virtual representation(s) may be rendered in addition to, in combination with, or instead of the virtual representations or VR environments already being rendered in the HMD.

In some instances, the system will also cease rendering the virtual representation(s) of real-world physical object(s) (act 906) in response to detecting the triggering event is no longer present and/or in response to a predetermined time or other measured parameters or values, such as values that pertain to the predetermined triggering event (e.g., fading the virtual representations out of view based on a function of the relative position/velocity of the HMD user).

Those skilled in the art will recognize that the principles of the present disclosure may be implemented in any suitably arranged system and method for transitioning into a virtual environment or warning users of real-world physical obstacles. While the foregoing embodiments are primarily described as applying to systems and methods incorporating true VR devices/systems, it will be appreciated that the foregoing embodiments can also be applied and do apply, in some embodiments, to non-traditional VR devices and systems, and even to other types of augmented-reality devices and systems that are configured to render different types of display elements and to transition the rendering of those display elements. Accordingly, it will be further appreciated that implementations of the invention includes the application of the foregoing methods and system configurations to augmented-reality devices and other rendering devices other than VR devices.

The systems, hardware storage devices, and methods for warning HMD users of real-world physical objects described herein may be used in combination with or in addition to other systems or methods for warning HMD users of real-world physical objects. For example, a virtual representation of a real-world physical object may be rendered in response to a triggering event in addition to providing audible warnings to the HMD user in response to a triggering event.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A computer system comprising:
one or more processors; and
one or more computer-readable hardware storage media having stored thereon computer-executable instructions, the computer-executable instructions being executable by the one or more processors to cause the computer system to implement a method that includes:
the computer system rendering a virtual reality environment in a virtual reality display of a head mounted display ("HMD");
the computer system detecting a relative proximity of at least one real-world physical object to the HMD;
the computer system detecting a predetermined triggering event for triggering a notification to the user of the at least one real-world physical object;
the computer system, in response to detecting the predetermined triggering event, obtaining a computer-generated virtual representation of the at least one real-world physical object; and
the computer system, in response to detecting the predetermined triggering event, and only while conditions of the triggering event continue to be present, rendering the computer-generated virtual representation of the at least one real-world physical object in the virtual reality display.

2. The computer system of claim 1, wherein the virtual representation of the at least one real-world physical object comprises an untextured representation of the at least one real-world physical object.

3. The computer system of claim 1, wherein the obtaining includes obtaining at least two different virtual representations, the at least two different virtual representations including an untextured representation of the at least one real-world physical object and one or more partially textured representation of the at least one real-world physical object, and wherein the rendering includes rendering at least the one or more partially textured representation.

4. The computer system of claim 1, wherein the predetermined triggering event is a detection of the HMD within a threshold proximity to and orientation towards the at least one real-world physical object.

5. The computer system of claim 1, wherein the predetermined triggering event is a detection of the HMD moving at a threshold velocity towards the at least one real-world physical object.

6. The computer system of claim 5, wherein the threshold velocity is a variable velocity value based on a function of the proximity of the HMD to the at least one real-world physical object.

7. The computer system of claim 6, wherein the variable velocity value is also based on a function of an orientation of the HMD.

8. The computer system of claim 1, wherein the predetermined triggering event is a detection of a new real-world physical object moving within a predetermined threshold proximity to the HMD.

9. The computing system of claim 1, wherein the predetermined triggering event comprises an acoustic signal that is generated externally from, and detected by, the computer system.

10. The computer system of claim 1, wherein rendering the virtual representation of the at least one real-world physical object comprises rendering the virtual representation of the at least one real-world physical object while refraining from rendering the virtual environment simultaneously with the virtual representation.

11. The computer system of claim 1, wherein execution of the computer-executable instructions further causes the computer system to:
after rendering the virtual representation of the at least one real-world physical object in the virtual reality display and in response to determining that conditions of the triggering event are no longer present, cease to render the virtual representation of the at least one real-world physical object in the virtual reality display.

12. A method implemented by a computing system for warning a user that is wearing a head mounted display ("HMD") of one or more obstacles that are present in the real world, the method comprising:
the computing system rendering a virtual reality environment in a virtual reality display of the HMD;
the computing system detecting the proximity of at least one real-world physical object to the HMD;
the computing system detecting a predetermined triggering event for triggering a notification to the user of the at least one real-world physical object;
the computing system obtaining a computer-generated virtual representation of the at least one real-world physical object; and
the computing system, in response to detecting the predetermined triggering event, temporarily rendering the computer-generated virtual representation of the at least one real-world physical object in the virtual reality display for a predetermined period of time.

13. The method of claim 12, wherein the virtual representation of the at least one real-world physical object comprises an untextured representation of the at least one real-world physical object.

14. The method of claim 12, wherein the obtaining includes obtaining at least two different virtual representations, the at least two different virtual representations including an untextured representation of the at least one real-world physical object and one or more partially textured representation of the at least one real-world physical object, and wherein the rendering includes rendering at least the one or more partially textured representation.

15. The method of claim 12, wherein the predetermined triggering event is a detection of the HMD moving at a threshold velocity towards the at least one real-world physical object.

16. The method of claim 12, wherein the predetermined triggering event is a detection of a new real-world physical object moving within a predetermined threshold proximity to the HMD.

17. The method of claim 12, wherein rendering the virtual representation of the at least one real-world physical object comprises rendering the virtual representation of the at least one real-world physical object while refraining from rendering the virtual environment simultaneously with the virtual representation.

18. The method of claim 12, further comprising:
after rendering the virtual representation of the at least one real-world physical object in the virtual reality display and in response to determining that conditions of the triggering event are no longer present, ceasing to render the virtual representation of the at least one real-world physical object in the virtual reality display.

19. The method of claim 12, wherein the temporarily rendering of the computer-generated virtual representation of the at least one real-world physical object in the virtual reality display for the predetermined period of time comprises pulsing the rendering of the of the computer-generated virtual representation of the at least one real-world physical object in the virtual reality display for the predetermined period of time.

20. A computer program product comprising one or more hardware storage devices having stored thereon computer-executable instructions, the computer-executable instructions being executable by one or more processors of a computer system to cause the computer system to implement a method that includes:
rendering a virtual reality environment in a virtual reality display of a head mounted display ("HMD");
subsequent to rendering the virtual reality environment in the virtual reality display, detecting a proximity of a real-world physical object within a threshold proximity to the HMD;
detecting the HMD is facing towards the one real-world physical object;
obtaining a virtual representation of the one real-world physical object; and
rendering the virtual representation of the real-world physical object in the virtual reality display of the HMD to warn a user of the HMD of the real-world object and based on detecting the real-world physical object is within a threshold proximity to the HMD and that the HMD is facing towards the real-world physical object.

21. The computer program product of claim 20, wherein the rendering of the virtual representation of the one real-world physical object in the virtual reality display occurs at least temporarily while refraining from rendering the virtual environment simultaneously with the virtual representation in the virtual reality display.

* * * * *